3,056,730
21-HYDROXYLATION OF STEROIDS
Allen I. Laskin, Franklin Township, N.J., assignor to Olin Mathieson Chemical Corporation, New York, N.Y., a corporation of Virginia
No Drawing. Filed June 14, 1961, Ser. No. 116,972
7 Claims. (Cl. 195—51)

This invention relates to, and has for its object the provision of, a method of producing 21-hydroxy steroids of the pregnane series. These steroids are known compounds which are either physiologically active or are useful in the preparation of physiologically active steroids by methods known in the art.

It has been found that steriods of the pregnane series (especially of the 3,20-diketo-$\Delta^4$-pregnene series), unsubstituted in the 17 and 21-positions, can be converted to their corresponding 21-hydroxy derivatives by subjecting the former to the action of enzymes of microorganisms of the genus Cercosporella. The action of the enzymes can be utilized either by bringing together, in an aqueous nutrient medium, the steroid, oxygen and enzymes or non-proliferating cells of the microorganism or (preferably) by including the steroid in an aerated culture of the microorganism.

In general, the conditions of culturing the microorganism for the purpose of this invention are (except for the inclusion of the steroid to be 21-hydroxylated) the same as those of culturing microrganisms for the production of antibiotics or vitamins; thus, the microorganism is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch, or dextrin) and/or the steroid itself. Preferably, however, the medium includes an assimilable source of carbon and energy in addition to the steroid.

The source of nitrogenous factors may be organic (e.g. soybean meal, corn steep liquor, meat extract, distillers solubles, peptones and/or yeast extract) or synthetic (i.e. composed of simply, synthesizable organic and inorganic compounds such as ammonium salts, alkali nitrates, amino acids or urea).

Among the 17,21-unsubstituted steroids of the pregnane series which may be converted into useful 21-hydroxy derivatives by the practice of this invention may be mentioned progesterone, oxidoprogesterones (e.g. $9\alpha,11\alpha$-oxidoprogesterone, $9\beta,11\beta$-oxidoprogesterone and $11\beta,12\beta$-oxidoprogesterone), $\Delta^1$-dehydroprogesterone, $\Delta^{16}$-dehydroprogesterone, pregnenolone, pregnane-3,20-dione, $6\beta$-hydroxyprogesterone, $9\alpha$- and $12\alpha$-halo-11-ketoprogesterones, and $9\alpha$- and $12\alpha$-lower alkyl (e.g. methyl)-11-ketoprogesterones.

Among the species of microorganisms of the genus Cercosporella which may be used can be mentioned Cercosporella herpotrichoides, C. acetosella, C. holci, C. pantoleuca, C. rubi, C. subulata and C. theae.

The following examples are illustrative of the invention (all temperatures being in centigrade):

EXAMPLE 1

21-Hydroxyprogesterone (a) Fermentation.—Surface growth of a two week old agar slant culture of Cercosporella herpotrichoides (American Type Culture Collection No. 12083), the slant containing as a nutrient medium (A):

| | G. |
|---|---|
| Glucose | 10 |
| Yeast extract | 2.5 |
| $K_2HPO_4$ | 1 |
| Agar | 20 |
| Distilled water to 1 liter. | | is suspended in 2.5 ml. of a 0.01% Duponol aqueous solution. One ml. portions of the suspension are used to inoculate 250 ml. conical flasks, each containing 50 ml. of the following sterilized medium (B):

| | G. |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Soybean oil | 2.2 |
| Distilled water to 1 liter. | |

After 72 hours' incubation at 25° with continuous rotary agitation (280 cycles per minute; 2 inch radius), 10% (vol./vol.) transfers are made to 250 ml. conical flasks each containing 50 ml. of fresh sterilized medium (B) plus 300 micrograms/ml. of progesterone. (The steroid is added by supplementing each flask with 0.25 ml. of a sterile solution of the steroid in N,N-dimethylformamide containing 60 mg./ml. of steroid.) After 92 hours of further incubation, the contents of the flasks are pooled and filtered through a Seitz clarifying pad. The flasks, mycelium and pads are washed with successive 50 ml. portions of warm water.

(b) Isolation of desoxycorticosterone.—The combined filtrate and washings are extracted with chloroform. The chloroform extracts are then washed with water and evaporated to dryness in vacuo. The resulting crude product is crystallized from acetone-hexane to give desoxycorticosterone.

EXAMPLE 2

$11\beta,12\beta$-Oxido Desoxycorticosterone

Following the procedure of Example 1, but substituting an equivalent amount of $11\beta,12\beta$-oxidoprogesterone in step (a), $11\beta,12\beta$-oxidodesoxycorticosterone is obtained.

EXAMPLE 3

$9\alpha$-Fluoro-11-Ketodesoxycorticosterone

Following the procedure of Example 1, but substituting an equivalent amount of $9\alpha$-fluoro-11-ketoprogesterone for the progesterone in step (a), $9\alpha$-fluoro-11-ketodesoxycorticosterone is obtained.

EXAMPLE 4

21-Hydroxy-$\Delta^{16}$-Dehydroprogesterone

Following the procedure of Example 1, but substituting an equivalent amount of $\Delta^{16}$-dehydroprogesterone for the progesterone in step (a), 21-hydroxy-$\Delta^{16}$-dehydroprogesterone is obtained.

EXAMPLE 5

$12\alpha$-Methyl-11-Dehydrocorticosterone

Following the procedure of Example 1, but substituting an equivalent amount of $12\alpha$-methyl-11-ketoprogesterone for the progesterone in step (a), $12\alpha$-methyl-11-dehydrocorticosterone is obtained.

EXAMPLE 6

$\Delta^{4,16}$-Pregnadiene-21-Ol-3,20-Dione

Following the procedure of Example 1, but substituting an equivalent amount of 16-dehydroprogesterone for the progesterone in step (a), $\Delta^{4,16}$-pregnadiene-21-ol-3,20-dione is obtained.

The invention may be variously otherwise embodied with the scope of the appended claims.

What is claimed is:

1. A process for preparing a 21-hydroxylated steroid of the 3,20-diketo-$\Delta^4$-pregnene series, which comprises subjecting a steroid of the pregnane series, unsubstituted in the 17α and 21-positions, to the action of enzymes of a microorganism of the genus Cercosporella in the presence of oxygen and recovering the resulting 21-hydroxy steroid.

2. The process of claim 1 wherein the microorganism is *Cercosporella herpotrichoides*.

3. The process of claim 2 wherein the steroid reactant is progesterone.

4. The process of claim 2 wherein the steroid reactant is 11β,12β-oxido progesterone.

5. The process of claim 2 where the steroid reactant is 9α-fluoro-11-ketoprogesterone.

6. The process of claim 2 wherein the steroid reactant is 12α-methyl-11-ketoprogesterone.

7. The process of claim 2 where the steroid reactant is $\Delta^{16}$-dehydroprogesterone.

References Cited in the file of this patent

UNITED STATES PATENTS 2,844,513     Wettstein et al. _____ July 22, 1958